ized Mechanical
(12) United States Patent
Reisch et al.

(10) Patent No.: US 8,936,528 B2
(45) Date of Patent: Jan. 20, 2015

(54) TRANSMISSION WITH DISENGAGEABLE VARIATOR

(71) Applicant: ZF Friedrichshafen AG, Friedrichshafen (DE)

(72) Inventors: Matthias Reisch, Ravensburg (DE); Bernard Hunold, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 13/927,357

(22) Filed: Jun. 26, 2013

(65) Prior Publication Data

US 2014/0011624 A1 Jan. 9, 2014

(30) Foreign Application Priority Data

Jul. 3, 2012 (DE) .......................... 10 2012 211 531

(51) Int. Cl.
*F16H 37/02* (2006.01)
*F16H 37/08* (2006.01)
*F16H 37/04* (2006.01)

(52) U.S. Cl.
CPC ............ *F16H 37/022* (2013.01); *F16H 37/084* (2013.01); *F16H 37/046* (2013.01); *F16H 2037/0893* (2013.01)
USPC .......................................... 475/207; 475/210

(58) Field of Classification Search
CPC ... F16H 37/022; F16H 37/046; F16H 37/084; F16H 2037/0893
USPC ......... 475/207, 210, 212, 213, 214, 216, 217, 475/302, 343; 74/330, 339, 340
See application file for complete search history.

(56) References Cited

U.S. PATENT DOCUMENTS 5,643,121 A * 7/1997 Greenwood et al. ............ 475/72
5,984,820 A 11/1999 Wedeniwski
(Continued)

FOREIGN PATENT DOCUMENTS

DE 196 44 133 A1 4/1997
DE 101 43 994 A1 3/2003
(Continued)

OTHER PUBLICATIONS

Dipl.-Ing. Friedr. W. Simonis, "Continuously Adjustable Mechanical Transmissions", Springer-Verlag, 1959.
(Continued)

*Primary Examiner* — Stefanos Karmis
*Assistant Examiner* — Timothy Hannon
(74) *Attorney, Agent, or Firm* — Davis & Bujold, PLLC; Michael J. Bujold

(57) ABSTRACT

A transmission, preferably for driving a motor vehicle, includes a multi-gear main transmission and a range group, that is connected downstream from the main transmission and comprises an input shaft and an epicyclic gear system. The epicyclic gear system comprises elements in the form at least of a central gearwheel and a planetary carrier. Furthermore, the transmission comprises a first connection for driving one of the elements of the epicyclic gear system by way of the input shaft of the range group and a variator, as well as a second connection that can be engaged with the first connection for driving a further element of the elements of the epicyclic gear system. When the second connection is engaged, the input shaft of the range group drives the variator and a drive output of the variator drives the further element of the epicyclic gear system.

12 Claims, 2 Drawing Sheets

(56) References Cited

U.S. PATENT DOCUMENTS

| | | | |
|---|---|---|---|
| 6,692,395 | B2 | 2/2004 | Rodeghiero et al. |
| 7,789,795 | B2 * | 9/2010 | McKenzie et al. ............. 477/41 |
| 8,230,752 | B2 | 7/2012 | Miller et al. |
| 2002/0169048 | A1 * | 11/2002 | Henzler et al. ............... 475/214 |
| 2003/0036452 | A1 * | 2/2003 | Fuhrer et al. ................. 475/207 |
| 2005/0075209 | A1 * | 4/2005 | Wafzig et al. ................ 475/216 |
| 2007/0149341 | A1 * | 6/2007 | McKenzie et al. ............ 475/210 |
| 2011/0021303 | A1 * | 1/2011 | Sich ............................. 475/210 |

FOREIGN PATENT DOCUMENTS

| | | |
|---|---|---|
| DE | 10 2007 010 828 A1 | 11/2008 |
| EP | 1 338 458 A1 | 8/2003 |

OTHER PUBLICATIONS

German Search Report Corresponding to 10 2012 211 531.5 mailed Apr. 12, 2013.

* cited by examiner

TRANSMISSION WITH DISENGAGEABLE VARIATOR

This application claims priority from German patent application serial no. 10 2012 211 531.5 filed Jul. 3, 2012.

FIELD OF THE INVENTION

The invention concerns a transmission, in particular for motor vehicles.

BACKGROUND OF THE INVENTION

Particularly for commercial vehicles such as trucks, transmissions with a wide gear spread and a large starting gear ratio are needed. On the one hand a main driving gear is usually needed, which with the aim of optimizing fuel consumption enables a maximum permissible top speed with a low engine speed. In many cases such a driving gear is made as a direct gear in order to ensure the greatest possible efficiency. On the other hand forward-starting gears and also in particular reverse-starting gears are needed, which enable maneuvering at low speed and starting with low clutch wear. Since in addition the step intervals between the gears should not exceed a certain size, the result is a large number of gears and correspondingly greater design complexity.

An example of such a commercial vehicle transmission is the ZF AStronic transmission. This, for example, can be obtained with 12 forward gears and a starting gear ratio of 16. The transmission is essentially geometrically stepped and has between the gears step intervals in each case of 1.3, the gears being configured in three transmission groups. A first, upstream splitter group has two gears, the main transmission three gears and a downstream range group has two gears. The range group is in the form of an epicyclic or planetary transmission.

The unexamined patent application DE 101 43 994 A1 discloses a modular transmission system for multi-gear commercial vehicles, with a two-gear upstream group, a multi-gear main transmission and a multi-gear downstream group. The downstream group is in the form of a planetary transmission with a sun gear that meshes with planetary gears arranged on a planetary carrier. In addition the planetary transmission comprises a ring gear that meshes with the planetary gears and which can be connected by means of a shifting element either to the housing or to the drive output shaft of the transmission. The output shaft is connected to the planetary carrier. Thus, the downstream group as such has two gears.

The unexamined patent application DE 10 2007 010 828 A1 discloses an automated group transmission comprising a multi-gear main transmission, a splitter group connected upstream from the main transmission and a two-stage range group connected downstream from the main transmission. The upstream group has two steps and is of countershaft design. The main group has for example four steps and is also of countershaft design. The range group is a two-step planetary system wherein a sun gear is connected in a rotationally fixed manner to an extension of the main shaft on the output side and the corresponding planetary carrier is connected rotationally fixed to the output shaft of the group transmission. The ring gear is connected to a shifting packet with two shifting clutches, by means of which the range group can be shifted selectively, i.e. alternatively, between a slow-driving stage obtained by connecting the ring gear to a fixed housing component or a fast-driving stage obtained by connecting the ring gear to the main shaft or to the sun gear. Alternatively a shift connection of the ring gear to the planetary carrier is possible.

To open up further consumption-saving potentials for the future, it can be advantageous to drive in the main driving gear with a lower engine speed. This could be achieved for example by a longer geared axle. As already mentioned at the beginning, however, starting gears are also needed so that a large gear spread results. Precisely in the case of transmissions with 2-gear range groups such as the transmissions described above, this means for example increasing the stationary gear ratio of the planetary transmission. Such an increase, however, would also result in a smaller number of built-in planetaries and necessitate a relatively small sun gear, whereby with increasing spread the structural volume of the range group and the costs increase. It is also difficult to achieve a desired large starting gear ratio as the spread requirement increases.

SUMMARY OF THE INVENTION

The purpose of the present invention is to provide a transmission which can be made compact and built inexpensively. Preferably it should also enable a wide spread with little structural complexity.

By providing a second, additional shiftable or connectable connection for transmitting torque from the input element of the range group to another element of the epicyclic gear system, torque can additionally be transmitted between the input shaft and the epicyclic gear system. In other words, in contrast to the transmissions known from the prior art a force flow can be power-branched off from the input shaft of the range group to two elements of the epicyclic transmission. In addition at least one further gear is provided, which in particular does not have to be created by virtue of a further gearwheel plane in the main transmission. In particular, by means of the variator when the second connection is engaged, continuously variable starting both forward and in reverse is enabled. Thus, thanks to the use of the variator, precise maneuvering around the stationary condition is possible. A starting clutch is no longer needed and can be omitted or designed only as a separator clutch. The omission of starting clutch elements and reversing gear elements provides considerable potential for saving fitting space and weight.

The motor vehicle can in particular be a commercial vehicle such as a truck. The main transmission and the range group downstream from it each form a transmission group of the transmission.

A connection between the input shaft of the range group and the epicyclic transmission or its elements can be understood to mean a connection for enabling a force flow between the input shaft and the epicyclic gear system element concerned.

The variator can preferably be a coaxial variator, which is preferably arranged coaxially with the (central) output shaft of the main transmission. This enables a more compact structure than other variator arrangements. As the variator, already known transmission variators can be used, for example but not exclusively friction-wheel variators (Nuvinci transmissions, toroidal transmissions, conical ring transmissions, Kopp Tourators, disco-planetary transmissions), wrap-around variators or shifting mechanism variators (Jahnel transmissions, Morse transmissions). These and other possible variators are, for example, also described in the textbook "Continuously adjustable mechanical transmissions" by Dipl.-Ing. Friedr. W. Simonis, Springer-Verlag (1959).

According to a preferred embodiment the input shaft of the range group can be shiftably connected to the variator for driving it, whereas the drive output of the variator can be connected shiftably to the further (another) element of the epicyclic gear system, By virtue of this preferred design the variator can be completely decoupled from the force flow of the transmission, which can increase the efficiency of the transmission.

In a further preferred embodiment the input shaft of the range group is in fixed connection with the variator for driving it, whereas the output of the variator can be connected shiftably with the further element of the epicyclic transmission. This embodiment enables a more compact structural form and saves one shifting element for engaging the variator drive input, so that costs and weight are saved. Depending on the type of variator, the efficiency losses can be made negligible by permanently coupling the variator drive to the drive input shaft.

In a further preferred embodiment the input shaft of the range group can be shiftably connected to the variator in order to drive it, whereas the drive output of the variator is connected fixed to the further element of the epicyclic transmission. This means that the drive output of the variator is in fixed connection with the further element so that it can be driven by the variator. This embodiment also enables a more compact structure and saves the cost and weight of a shifting element for engaging the variator's output. Depending on the type of variator, the efficiency losses can be made negligible by this permanent coupling of the variator's output to one of the elements of the epicyclic gear system.

In a general sense, the term input shaft of the range group can also be understood to mean the output shaft of the main transmission. The input shaft of the range group is preferably a central shaft of the transmission or a central input shaft.

In accordance with another preferred embodiment the epicyclic transmission has a stationary gear ratio such that the stationary gear ratio of the variator for enabling starting in the forward or reverse direction when the second connection is engaged, can be adjusted to be equal to or higher or lower than the stationary gear ratio of the epicyclic transmission. In this context stationary gear ratio means, as is commonly understood in the field, that the carrier or planetary carrier of the epicyclic transmission is at rest. If the stationary gear ratio of the variator has the same value as that of the epicyclic transmission, the drive output is stationary. If the stationary ratio of the variator deviates in any direction, then depending on the direction of the deviation the drive output begins rotating forward or backward. Thus, forward and reverse driving are enabled. Any reverse gear shifting planes in the main transmission or other transmission elements that enable reverse gears can be omitted.

In a further preferred embodiment the stationary gear ratio of the variator can be adjusted to deviate less than 10%, preferably less than 5% from the stationary ratio of the epicyclic transmission. Already adjustment ranges as small as that suffice, whereby the variator can be made compact. Slow driving is made possible. If faster driving with the variator engaged is also desired, the adjustment range can of course also be chosen larger.

According to another preferred embodiment, when the second connection is engaged the main transmission is in one of the two highest gears, preferably the top gear. This feature increases the efficiency. In this way the variator can preferably be operated at lower torques and higher rotational speeds than when lower main transmission gears are used.

Even when a variator with relatively poor efficiency has to be used, the effects of this are acceptable since the proportion of time during a typical driving collective is very small (maneuvering operations). Moreover, the omission of a starting clutch and the fact that starting is not carried out with a clutch operating with slip can at least partially compensate such a limitation.

According to a further preferred embodiment, the variator has an adjustment or gear ratio range and the transmission between the drive output of the variator and the further element of the epicyclic gear system has a further gear ratio or gear step for displacing the adjustment range of the variator. By virtue of such an additional gear step the gear ratio can be displaced into a range favorable for the variator. This can increase the efficiency and reduce the size of the variator, again resulting in cost and weight savings.

In another preferred embodiment the transmission has a housing. Furthermore, the at least one central gearwheel (for example the sun gear and/or the ring gear) and the planetary carrier rotate at a common speed for the production of a first driving range. In addition, to produce a second driving range one of the elements of the epicyclic transmission can be connected to the transmission housing. By engaging the second connection a third, power-branched driving range is produced, in which a force flow takes place between the input shaft of the range group and the epicyclic transmission both by way of the first connection and also via the second (parallel) connection. Preferably, during power-branched operation the main transmission is in a top gear (for example direct gear or overdrive). By using the third driving range, for example some gears of the main transmission can be omitted. Moreover, continuously variable staring is possible.

In a further preferred embodiment, in the second driving range the further element of the elements of the epicyclic gear system can be connected to the transmission housing. The further element of the epicyclic transmission can for example be a ring gear of the epicyclic gear system. Depending on the specific structure of the epicyclic transmission, however, other elements too can be considered. The driving of the ring gear of the epicyclic transmission by the variator enables a good transmission gradation and transmission spread to be obtained.

The features of the above-mentioned embodiments can be combined with one another.

BRIEF DESCRIPTION OF THE DRAWINGS

The invention will be described in more detail with reference to the figures. However, these should not be understood to have any restrictive force. The figures show.

DETAILED DESCRIPTION OF THE PREFERRED EMBODIMENTS

In the two figures the same or corresponding components are given the same indexes.

Figure 1:
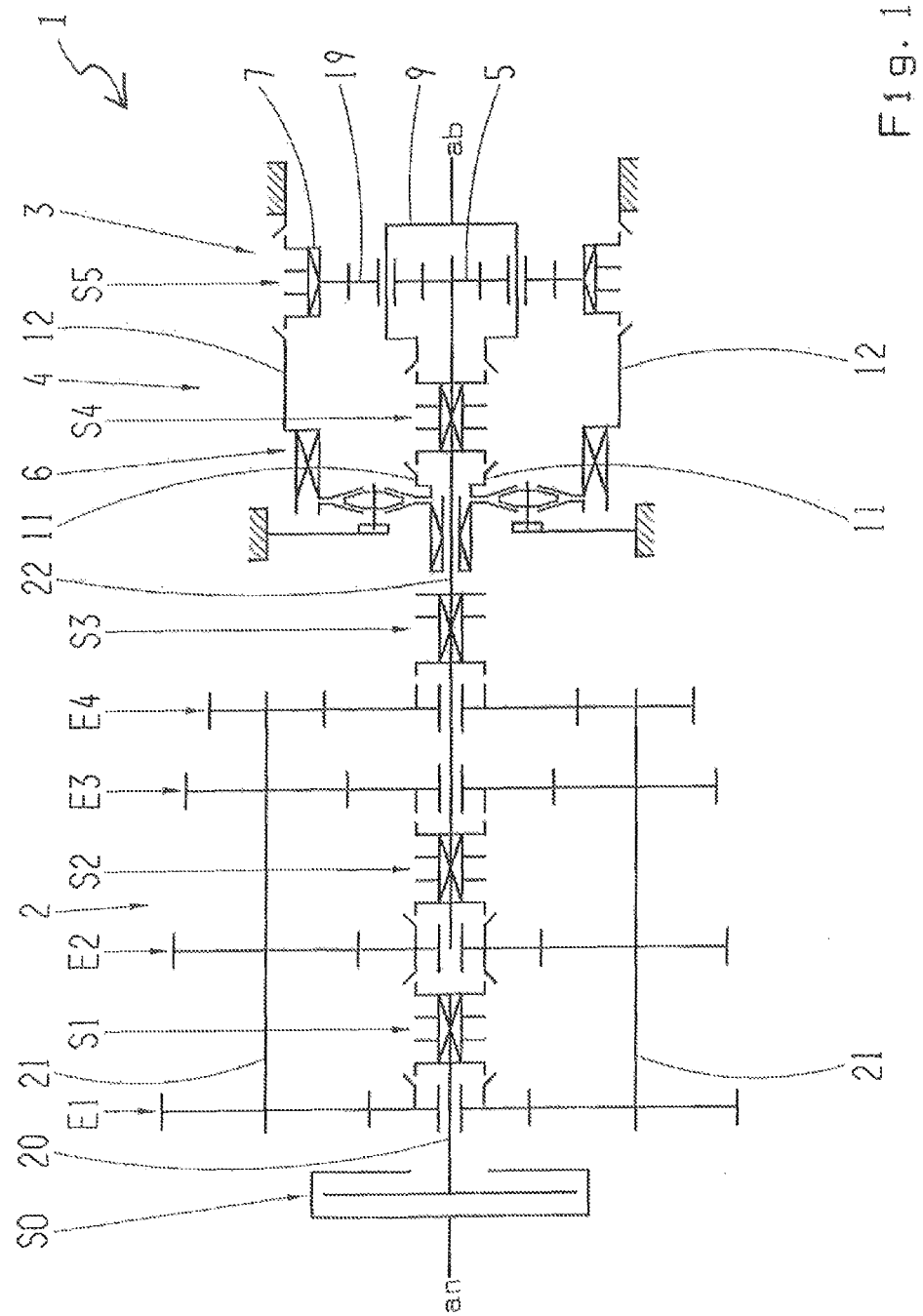
FIG. 1: A schematic representation of the structure of a transmission according to a first example embodiment of the invention.

FIG. 1 shows a gear layout of a first gearset representing a first example embodiment according to the invention. The transmission 1 shown comprises a main transmission in the form of a countershaft transmission 2 and a range group 4 connected downstream therefrom, which comprises an epicyclic transmission or planetary gear system. The countershaft transmission 2 and the range group 4 can be regarded as transmission groups of the group transmission. Upstream from the countershaft transmission 2 is connected a clutch S0. The drive input (an) to the clutch can for example be provided by a motor, in particular an internal combustion engine. The countershaft transmission 2 is driven by a central input shaft 20 and comprises four shifting planes E1, E2, E3, E4 and two countershafts 21. As shown, on the countershafts 21 are preferably arranged respective fixed wheels (gearwheels) which mesh with loose wheels arranged on the central shaft. Such a structure of a main transmission 2, as such, is known to those familiar with the field. The shifting planes can be connected by means of shifting devices S1, S2, S3 to the main or central shaft, such that the shifting elements can be components known to those familiar with the field, such as claws, synchronizers, powershift clutches, etc. The drive output of the countershaft transmission 2 takes place by way of a central output shaft 22, which in the present example embodiment corresponds to the input shaft 22 of the range group 4. Accordingly, the central shaft passing through the countershaft transmission 2 can be made in more than one section, for example in two parts in the axial direction, wherein the input and output shafts 20, 22 can be connected by shifting elements S1, S2. The drive output of the countershaft transmission 2, or input shaft 22 of the range group, can be connected to the sun gear 5 or the planetary carrier 9. The planetary carrier 9 or carrier of the planetary gearwheels 19 is preferably connected fixed to the drive output (ab) of the transmission or planetary transmission 3. If the drive output of the planetary transmission 3 takes place by way of the sun gear 5 and also by way of the carrier 19 (coupling by means of shifting element S4), then a direct gear is enabled. In that case the ring gear 7 of the planetary transmission 3 is not blocked or fixed. The ring gear 7 can if necessary be blocked by means of a shifting element S5. Preferably, the sun gear 5 is, as shown, connected fixed to the input shaft 22 and driven by it. In the present example embodiment, although a countershaft transmission 2 is used as the main transmission 2, other main transmissions 2 can be used, which drive the epicyclic transmission 3 by means of a shaft 22.

In addition to the already described first connection of the input shaft 22 of the range group 4 to the epicyclic transmission 3 so that the sun gear 5 or the planetary carrier 9 can be driven by the input shaft 22, there is a second, engageable connection. With this second, additional connection a further force flow can be passed by way of a variator 6 of the range group 4 from the input shaft 22 of the range group 4 to another element of the epicyclic transmission 3. In the example embodiment illustrated, the other element of the epicyclic transmission 3 is the ring gear 7. The connection can be formed on the one hand by engaging the shifting element S5, which then connects an output 12 of the variator 6 to the ring gear 7 in order to drive it. Of course, when the variator 6 is engaged the ring gear 7 is not additionally fixed or blocked by S5, but can rotate together with the output 12 of the variator 6. On the other hand, the variator 6 is shiftably connected to the input shaft 22. As shown, the engagement preferably takes place by means of a shifting element S4. This shifting element S4 can optionally couple the input shaft 22 to the planetary carrier 9 or to an output 11 of the variator 6. The variator 6 is depicted as a coaxial variator, such that its drive output 11 extends coaxially around the output shaft 22. The same applies to the variator output 12. The shifting elements S4 and S5 can be in the form of components known to those familiar with the field. Consequently, the variator 6 can either be completely decoupled from the force transmission by shifting S4 and S5, or it can provide an additional connection for transmitting a force flow between the input shaft 22 and the epicyclic transmission 3, in particular the ring gear 7 thereof. This enables a further power-branched driving range which, as already described, makes it possible to start forward or in reverse in a continuously variable manner. Correspondingly, in the main transmission 2 shown no reverse gear planes are provided, and the main transmission 2 is consequently compact and lightweight.

In general, however, the form of the main transmission 2 illustrated should not be regarded as having any restrictive force. Thus for example, in the present example embodiment two countershafts 21 are disclosed. Generally, however, fewer or more countershafts 21 can be used, for example three, four, five or six countershafts 21. Furthermore, in the example embodiment of FIG. 1 four gearwheel planes are provided in the countershaft transmission 2. Depending on the specific application, the number can be larger or smaller. Moreover, a further transmission group can be connected upstream from the main transmission 2.

In general, there are preferably three driving ranges:
a first driving range (fast driving range) in which all the gears of the main transmission 2 are used but a straight-through drive takes place in the planetary transmission 3;
a second driving range (slow driving range) in which all the gears of the main transmission 2 are used and the planetary transmission 3 is active; and finally
a third driving range, in which the main transmission is preferably operated in the highest gear and the output shaft 22 of the main transmission 2 or input shaft 22 of the range group 4 drives both the variator 6 and the planetary transmission 3 (directly) in a power-branched manner.

Figure 2:
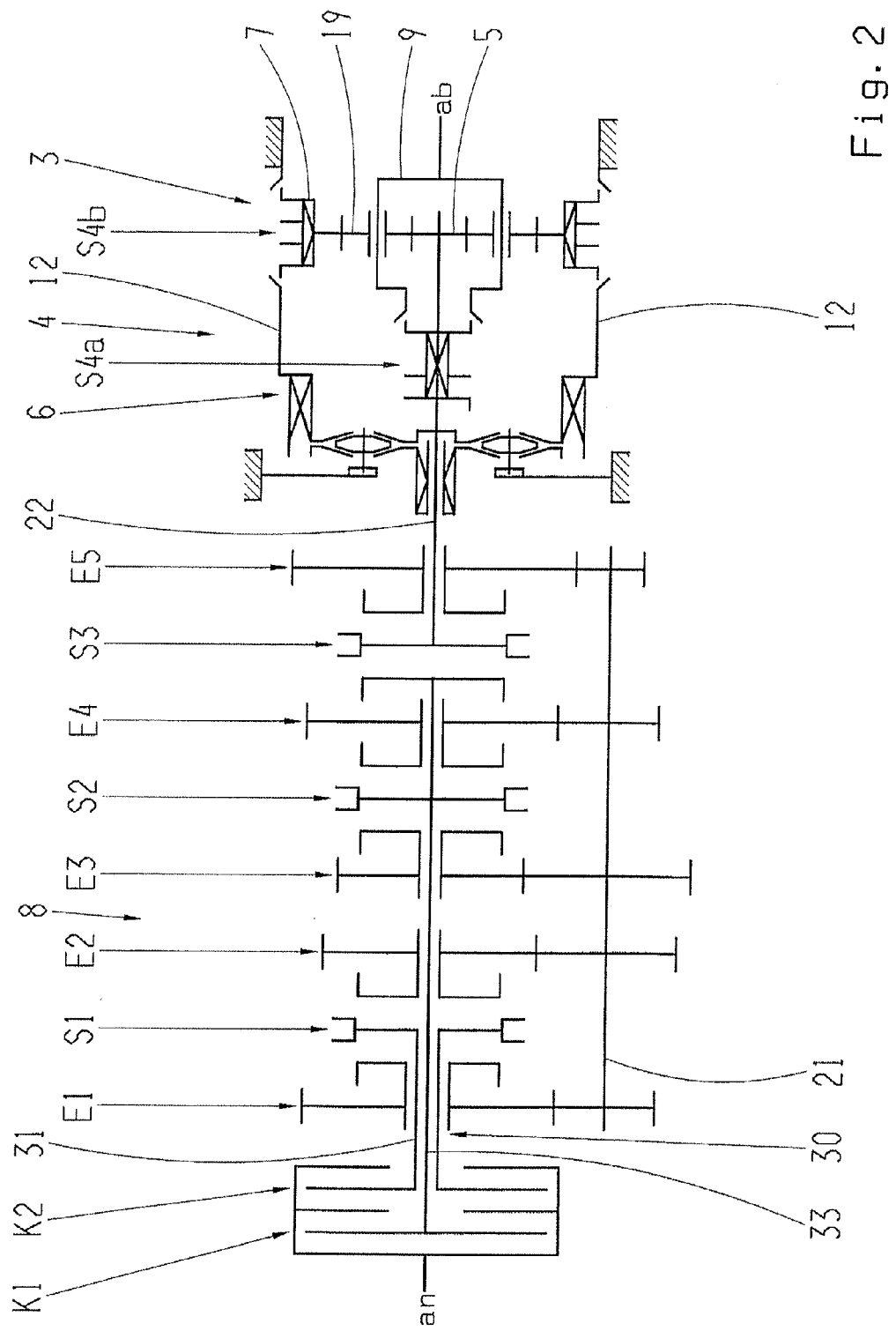
FIG. 2: A schematic representation of the structure of a dual-clutch transmission according to a second example embodiment of the invention.

FIG. 2 shows another gearset according to a further example embodiment of the invention. In this example the transmission or group transmission is in the form of a dual-clutch transmission. As shown, it comprises the two clutches K1, K2 and a six-gear (power shifting) main transmission 8. Correspondingly, the central input shaft 30 of the main transmission 8 is made in more than one section and comprises a hollow shaft 31 that is connected to the shifting element S2 and the clutch K2. The clutch K1 is connected by the shaft 33 inside the hollow shaft 31 to the shifting element S2. In addition, the shaft 33 can be connected by the shifting element S3 to the shaft 22. The main transmission 2 has five shifting planes E1, E2, E3, E4, E5 and a countershaft 21 with gearwheels (fixed wheels) arranged on the shaft 21, which can be connected by means of the shifting elements S1, S2, S3 to gearwheels (loose wheels) arranged on the input shaft 30.

In contrast to the arrangement shown in FIG. 1, the variator 6 in the example embodiment of FIG. 2 is in fixed connection with the input shaft 22 of the range group 4. Thus, the drive input side of the variator 6 is always driven by the input shaft 22 of the range group 4. This cuts out one shifting element for connecting the variator's drive input to the shaft 22, whereby costs can be saved and the weight of the transmission reduced. The shifting element S4a shown serves only to connect the shaft 22 to the planetary carrier 9 of the epicyclic transmission 3, so that the epicyclic transmission is equivalent to the epicyclic transmission in the example embodiment according to FIG. 1. The shifting element S4b either allows a connection of the drive output 12 of the variator 6 to the ring gear 7 of the epicyclic transmission 3, or enables the ring gear 7 to be fixed on the housing of the transmission when the variator 6 is not engaged.

All the features of the example embodiments described can be combined with one another or exchanged with one another.

INDEXES

2 Main transmission/countershaft transmission
3 Epicyclic transmission

4 Range group
5 Sun gear
6 Variator
7 Ring gear
8 Powershifting main transmission
9 Planetary carrier
11 Drive input of the variator
12 Drive output of the variator
20 Input shaft of the main transmission
21 Countershaft
22 Input shaft of the range group/output shaft of the main transmission
30 Central input shaft of the main transmission
31 Hollow shaft
33 Shaft extending through the hollow shaft
ab Transmission output
an Transmission input
E1 First wheel plane of the main transmission
E2 Second wheel plane of the main transmission
E3 Third wheel plane of the main transmission
E4 Fourth wheel plane of the main transmission
E5 Fifth wheel plane of the main transmission
K1 First clutch
K2 Second clutch
S0 Clutch
S1 First shifting element
S2 Second shifting element
S3 Third shifting element
S4 Fourth shifting element
S5 Fifth shifting element
S4a Shifting element
S4b Shifting element

The invention claimed is:

1. A transmission for propelling a motor vehicle, the transmission comprising:
    a drivable, multi-gear main transmission (2);
    a range group (4) connected downstream from the main transmission (2), and the range group (4) comprising an input shaft (22) and an epicyclic gear system (3);
    the epicyclic gear system (3) comprising elements in the form at least of a central gearwheel (5, 7) and a planetary carrier (9) supporting a plurality of planetary gearwheels (19) meshing with the central gearwheel (5, 7);
    the range group (4) also comprising a variator (6); and
    the input shaft (22) of the range group (4) comprising a first connection for driving a first element (5, 7, 9) of the epicyclic gear system (3); and
    the input shaft (22) of the range group (4) also comprising a second connection for driving another element (5, 7, 9) of the epicyclic gear system (3) such that, when the second connection is engaged, the input shaft (22) of the range group (4) drives an input of the variator (6) and a drive output (12) of the variator (6) drives the second element of the epicyclic gear system.

2. The transmission according to claim 1, wherein the input shaft (22) of the range group (4) is shiftably connectable to the variator (6) in order to drive the variator (6), and the output (12) of the variator (6) is shiftably connectable to the another element of the epicyclic gear system.

3. The transmission according to claim 1, wherein the input shaft (22) of the range group (4) is fixedly connected with the variator (6) in order to drive the variator (6), and the drive output (12) of the variator (6) is shiftably connectable to the another element of the epicyclic gear system (3).

4. The transmission according to claim 1, wherein the input shaft (22) of the range group (4) is shiftably connectable to the variator (6) in order to drive the variator (6), and the output (12) of the variator (6) is fixedly connected to the another element (5, 7, 9) of the epicyclic gear system.

5. The transmission according to claim 1, wherein a stationary gear ratio of the variator (6) is adjusted, either higher or lower, than a stationary gear ratio of the epicyclic gear system (3) to enable forward and reverse starting when the second connection is engaged.

6. The transmission according to claim 5, wherein the stationary gear ratio of the variator (6) is adjustable to at least one of equal to the stationary ratio of the epicyclic gear system (3) and to deviate, by less than 10%, from the stationary ratio of the epicyclic gear system (3).

7. The transmission according to claim 1, wherein the main transmission (2) has two highest gears, and one of the two highest gears is engaged when the second connection is engaged.

8. The transmission according to claim 1, wherein the variator (6) has an adjustment range and, between the drive output (12) of the variator (6) and the another element of the epicyclic gear system (3), the transmission has a further gear ratio for displacing the adjustment range of the variator (6).

9. The transmission according to claim 1, further comprising a housing,
    the at least one central gearwheel (5, 7) and the planetary carrier (9) rotate at a common speed to produce a first driving range,
    one of the elements (5, 7, 9) of the epicyclic gear system (3) is connectable to the housing to produce a second driving range, and
    by engaging the second connection, a third power-branched driving range is produced in which a force flow occurs between the input shaft (22) of the range group (4) and the epicyclic gear system (3) both by the first connection and by the second connection.

10. The transmission according to claim 9, wherein, in the second driving range, the another element of the epicyclic gear system (3) is connectable to the housing.

11. The transmission according to claim 1, wherein the another element of the epicyclic gear system (3) is the ring gear (7).

12. A transmission for propelling a motor vehicle, the transmission comprising:
    a drivable, multi-gear main transmission;
    a range group connected downstream from the main transmission (2), and the range group comprising:
        only a single range group input shaft,
        an epicyclic gear system driving an output shaft of the main transmission, and the epicyclic gear system comprising elements in the form at least of a central gearwheel and a planetary carrier supporting a plurality of planetary gearwheels meshing with the central gearwheel; and
        a variator;
    the single input shaft of the range group comprising a first connection for driving a first one of the elements of the epicyclic gear system; and
    the input shaft of the range group also comprising a releasable second connection for driving another element of the elements of the epicyclic gear system such that, when the second connection is engaged, the single input shaft of the range group drives the variator and a drive output of the variator drives the another element of the epicyclic gear system; and
    the variator being arranged coaxially with the output shaft of the main transmission.

* * * * *